June 7, 1932.  E. W. SWANSON ET AL  1,861,588
CONTROL APPARATUS FOR ELECTRIC MACHINES
Filed July 12, 1930  2 Sheets-Sheet 1
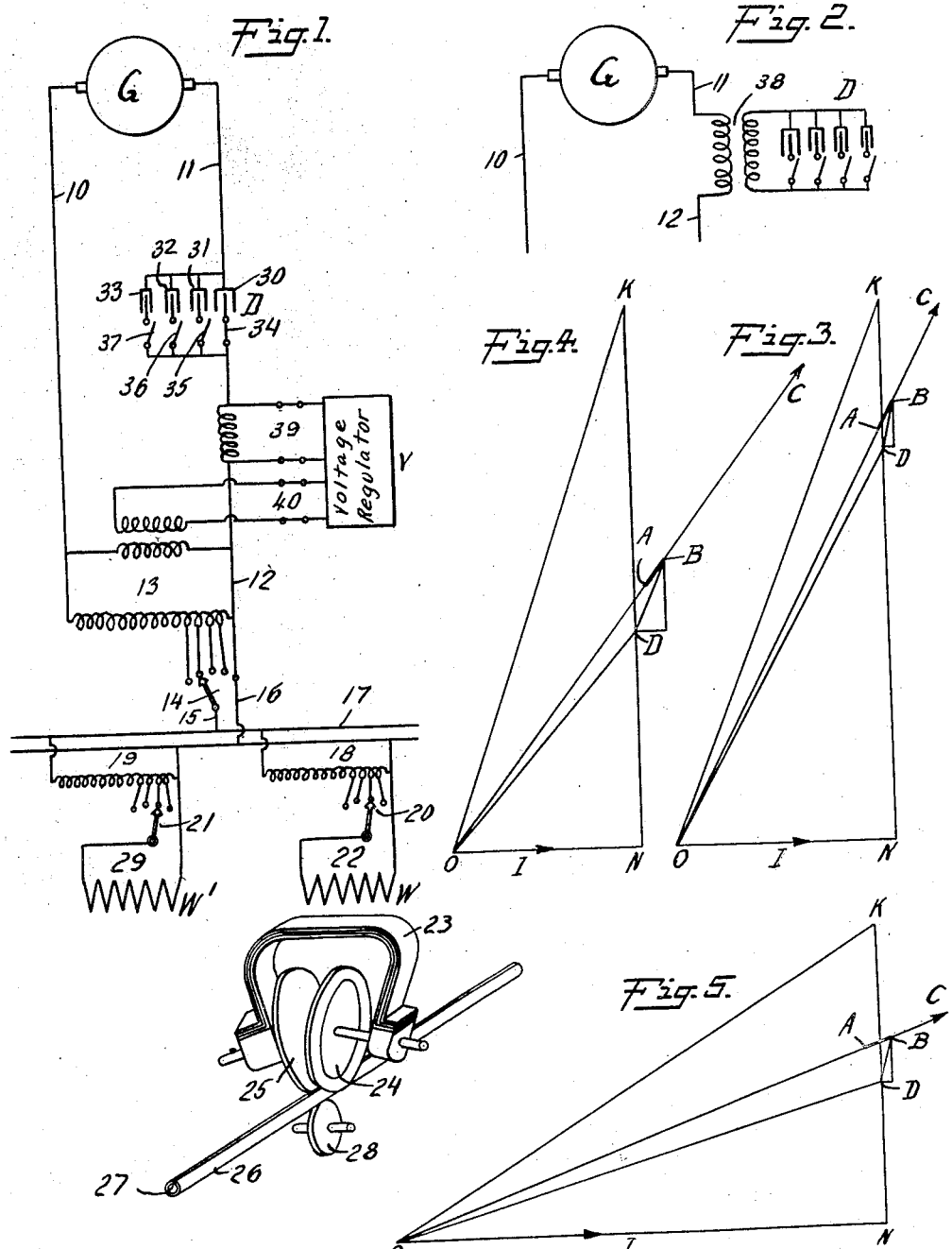
INVENTORS
Edwin W. Swanson and
Frank N. Swanstrom
BY
Pennie, Davis, Marvin & Edmonds.
ATTORNEYS

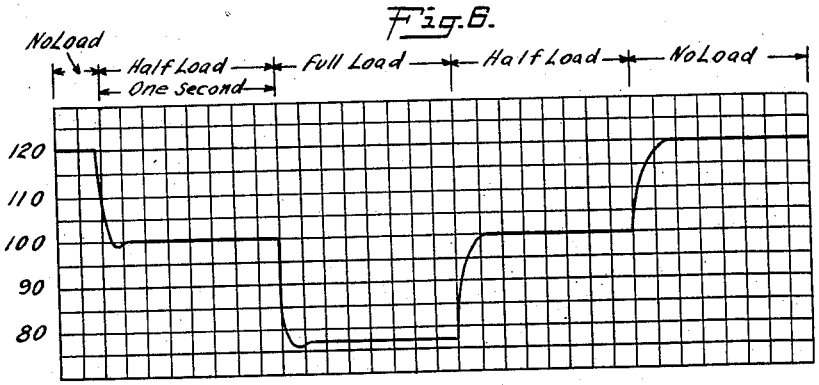
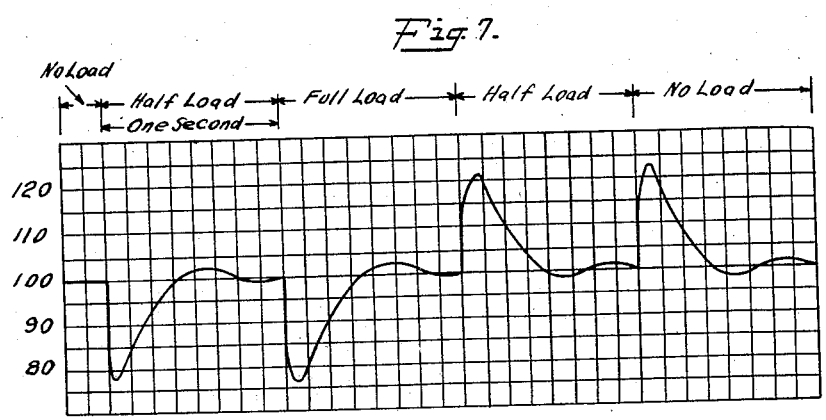
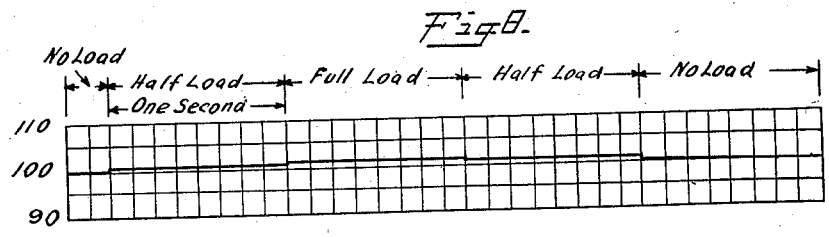
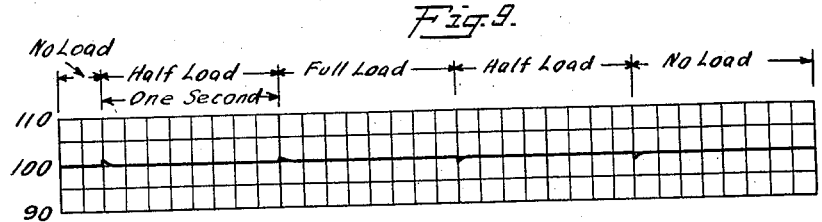

Patented June 7, 1932

1,861,588

UNITED STATES PATENT OFFICE

EDWIN W. SWANSON, OF HOPKINS, AND FRANK N. SWANSTROM, OF MINNEAPOLIS, MINNESOTA, ASSIGNORS TO ELECTRIC MACHINERY MANUFACTURING COMPANY, OF MINNEAPOLIS, MINNESOTA, A CORPORATION OF MINNESOTA

CONTROL APPARATUS FOR ELECTRIC MACHINES

Application filed July 12, 1930. Serial No. 467,470.

This invention relates to electric circuits and more particularly concerns a constant voltage alternating current power supply circuit for use with variable loads and power factors.

In many electrical installations, it is necessary to operate a variable number of current consuming devices or other variable load at a substantially constant voltage from a single source of alternating current. The terminal voltage of a power source, such as a generator, varies considerably with changes in the load imposed thereon, and accordingly, voltage regulators responsive to variations in generator voltage and acting to compensate for such variations by variably regulating the generator excitation have been heretofore employed in some installations. The voltage regulation thus obtained is unsatisfactory in many installations where substantial variation of load voltage is to be avoided.

For example, in electric arc welding and particularly in the seam welding of metallic tubes or sheets, the edges to be joined are moved continuously and rapidly past a pair of electrodes and the weld is continuously formed by the current flow between such electrodes. The magnitude of the current flowing across the seam between the welding electrodes and the speed at which the work travels determines the structure of the weld, and since it is desirable that the work travel continuously at a fixed speed, the welding current must remain constant if a uniform weld is to be obtained. When a plurality of welders of this type are supplied with current from a single source such as a generator, or a plurality of generators connected in parallel, and when the load is varied by energizing or deenergizing certain welders while other welders remain in operation, the generator voltage variations resulting from these load changes vary the current flow between the electrodes of the energized welders and result in undesirable variations in the weld produced thereby. Known types of voltage regulators are not effective to overcome this difficulty, since such regulators, being responsive to and actuated by variations in generator voltage or load current, necessarily permit at least a momentary variation in such voltage or current before correcting this variation.

Momentary variations of this type are fatal to the production of a uniform weld, particularly when the work moves past the welder electrodes at a high speed. Thus in the seam welding of tubes or pipes, where the pipe may travel through the welding machine at a rate as high as 150 ft. per minute, an appreciable voltage rise or drop of one second duration (the usual minimum interval required to correct the voltage by means of known voltage regulators) would burn the tube or cause an imperfect weld over thirty inches of travel of the seam.

With the above and other considerations in mind, it is proposed in accordance with the present invention to provide constant voltage means for supplying alternating current electrical energy to a variable load. More specifically, it is proposed to provide an alternating current supply circuit including a generator and incorporating means for preventing any substantial variation in the load voltage when heavy loads are suddenly connected to or removed from the supply circuit.

Various other objects, advantages and characteristic features of the invention will be pointed out or will become apparent as the description thereof progresses.

In general, the objects of our invention are carried out by providing an alternating current generator which may be connected through suitable circuits to any or all of a plurality of current consuming devices or other variable loads, and by including in series with the generator a capacitor having a condensive reactance of such a value that the drop in generator voltage resulting from an increase in load is instantaneously compensated for or off-set by the reactance voltage of the capacitor, and the load voltage is maintained substantially constant when the load is varied over a wide range. The series capacitor acts in two ways to maintain the load voltage substantially constant when the load is varied. The capacitor voltage increases with the load and substracts vectorially from the generator terminal voltage which normally decreases with the load and in this manner the capacitor reduces variations in load voltage due to variations in generator voltage with changes in the load. The capacitor has a further compensating effect on the load voltage in that it improves the power factor on the generator and thereby increases the magnetization and the generated voltage of the generator as the load increases.

The invention will be best understood by reference to the accompanying drawings in which alternating current power supply circuits incorporating certain embodiments of our invention have been shown. In the drawings;

Fig. 1 is a diagrammatic and simplified representation of a supply circuit incorporating one form of our invention as applied to a plurality of electric welding devices.

Fig. 2 is a partial view of the circuit shown in Fig. 1 including a modified means for connecting the condensive reactance in the circuit;

Figs. 3, 4 and 5 are vector diagrams representing the voltages in our improved circuit under various conditions of load and power factor;

Fig. 6 is a graph showing the variation in load voltage when a variable load is connected to a generator having no voltage regulating means;

Fig. 7 is a graph similar to Fig. 6 showing load voltage variations when a special high speed type of voltage regulator is employed;

Fig. 8 is a graph of load voltage under varying load when our improved constant voltage circuit is employed; and Fig. 9 is a graph similar to Fig. 7 showing the load voltage under varying load in our improved circuit when a voltage regulator is employed in connection with the generator.

Referring to the drawings, and more particularly to Fig. 1, in the disclosed embodiment, a single phase alternating current generator G is employed to supply electrical energy to a plurality of electric welders W and W'. It is to be understood that our invention is applicable to various alternating current sources and variable loads other than the particular generator and welders shown.

In the disclosed embodiment, the generator G is connected through the wires 10, 11 and 12 across the primary of an auto transformer 13, the secondary of which is connected through the variable voltage taps 14 and the wires 15 and 16 to the bus bars or load wires 17. The welders W and W' are preferably connected across the bus bars 17 through auto transformers 18 and 19 provided with variable tap switches 20 and 21 respectively in the secondary windings thereof.

The welders disclosed are seam welders designed to weld and seal a seam in a continuously moving tube. As shown, the welder W includes a primary winding 22 inductively coupled to a single turn secondary or yoke 23 of large current capacity. The yoke 23 is open and the depending legs thereof terminate respectively in two electrodes 24 and 25 which preferably comprise discs or wheels rotatably supported by and electrically connected with the legs of the yoke 23. In operation, the object to be welded, which in the present instance comprises a tube 26 having a longitudinal seam 27 therein, is continuously moved longitudinally beneath the welder yoke 23 with the electrodes 24 and 25 in contact therewith on opposite sides of and adjacent to the seam 27. The tube 26 may be supported in contact with the electrodes 24 and 25 by means of a roll 28. Since the several welders employed are of similar construction, a detailed showing of the second welder W' has been omitted to simplify the drawings, it being understood that the primary winding 29 of this welder is inductively coupled to an electrode circuit in the manner described in connection with the welder W.

In accordance with our invention, a condensive reactance of proper capacity is included in series with the generator to maintain the load voltage constant when the number of welders energized by the generator is varied or when the load on the energized welders changes. In the embodiments disclosed in Fig. 1, a capacitor D is connected in series with the generator G between the wires 11 and 12 as shown. The capacitor D may take any suitable form and as shown includes a plurality of condenser units 30, 31, 32 and 33, arranged to be selectively connected in series with the generator by the switches 34, 35, 36 and 37 respectively. The several condenser units are preferably of different capacities and at least some of these units are preferably of small capacity so that the total capacity included in the generator circuit may be accurately adjusted to suit the generator voltage and the circuit conditions. If desired, the capacitor D may be connected to the generator circuit through a step-up transformer 38 as shown in Fig. 2. In this manner, the desired capacity may be supplied from condensers of smaller dimensions than those necessary if the condensers are connected directly in the generator circuit.

In one embodiment of our invention, a suitable voltage regulator is employed in connection with the generator, and accordingly, a voltage regulator V has been diagrammatically represented in Fig. 1. The regulator is connected to the generator output circuit 10—12 in the usual manner through suitable switches 39 and 40. Since voltage regulators are well known in the art and since the construction thereof forms no part of the present invention, the regulator V will not be described in detail herein. It is sufficient to understand that the regulator V acts, in response to changes in load voltage across the circuit 10—12, to vary the generator excitation and thereby correct voltage variations in this circuit. In certain cases, satisfactory operation may be obtained without the use of the voltage regulator V, and our invention, in its broader aspects, is not limited to the use of a device of this type.

Referring now more particularly to the value of condensive reactance employed, it may be stated in general that this reactance is so chosen that the vector difference of the voltage across the generator and the voltage across the capacitor, is of substantially constant magnitude during variations in load. The generator voltage decreases with an increase in load current drawn due mainly to the armature reaction, armature reactance and effective armature resistance of the generator, whereas the voltage across the capacitor, being the product of the load current and the condensive reactance of the capacitor, increases with an increase in load current. With a given design of generator, the armature reactance and effective armature resistance do not vary with variations in power factor, whereas the armature reaction varies with the power factor. Thus, the armature reaction caused by a lagging armature current has a demagnetizing effect on the generator and lowers the generator voltage, and if the lag of this current is decreased, that is, the power factor improved, the demagnetizing effect is decreased and the generated voltage raised.

In accordance with the present invention, the capacitor employed stabilizes the load voltage in two ways, first by subtracting its own voltage vectorially from the generator voltage and second by improving the power factor on the generator and thus supplying additional magnetization and raising the generated voltage. The value of capacity required to maintain the load voltage substantially constant over a wide range of loads and power factors can be calculated when the characteristics of the generator and the load are known.

In the following equations, $E_L$ represents the load voltage, $E_T$, the generator terminal voltage, $E_g$, the internal generated voltage of the generator and $E_C$, the voltage across the capacitor. The capacitor voltage $E_C$ may also be expressed as $$\frac{I}{2\pi f C}$$

where I is the load current, $f$ the frequency and C the capacity of the capacitor in farads. The generator impedance will be expressed as $z_g$ and is made up of the generator resistance $r_g$ and the generator reactance $x_g$.

Considering the circuit shown in Fig. 1 of the drawings, the terminal voltage of the generator G will equal the vector sum of the voltages across the condenser D and the load. This may be expressed in an equation as follows:

$$E_T = E_C + E_L$$

The generator terminal voltage may also be expressed as the difference between the generated voltage and the impedance drop in the generator $$E_T = E_g - I z_g$$

substituting the above value of $E_T$ in the first equation, $$E_g - I z_g = E_C + E_L$$

or $$E_L = E_g - I z_g - E_C$$

since $$E_C = \frac{I}{2\pi f C},$$

$$E_L = E_g - I z_g - \frac{I}{2\pi f C}$$

Solving this equation for the capacity of the condenser, $$C = \frac{I}{2\pi f (E_g - I z_g - E_L)}$$

In accordance with the present invention, the value of condenser capacity C in the above equation is constant and the load voltage $E_L$ is also constant under wide variations in load current I. Accordingly, since the current I varies with changes in load, and since the factor $2\pi f$ is constant, the generated voltage $E_g$ must vary with the load current at a rate sufficiently greater than the rate of variation of the factor $I z_g$ to maintain the value of the factor $$\frac{I}{2\pi f (E_g - I z_g - E_L)}$$

substantially constant over a wide range of values of load current. This result is accomplished in the present invention due to the increased magnetization resulting from the improvement in power factor effected by the condenser, as well as the increase in the voltage across the condenser upon an increase in load. It should be noted that since the quantities expressed in the above derived equation for the capacity of the condenser are vector quantities, the direction or angular relation of the quantities as well as their magnitude must be considered.

The manner in which the present invention maintains the load voltage substantially constant with wide variations in load current and power factor can be best understood by a consideration of vector diagrams representing different load conditions. In order that actual operating conditions may be represented, the vector diagrams shown in Figs. 3, 4 and 5 are all drawn to the same scale and the lengths and angular relations of the vectors correspond to the voltages and power factors obtained in actual tests. The tests from which the data employed in plotting the vector diagrams was obtained were conducted on a 1270 volt, 10½ ampere single phase alternator having a normal rating of 13.35 K. V. A., and a capacitor of approximately 70 microfarads capacity was employed as the capacitor D. The load current and power factor were varied to obtain the values plotted in the vector diagrams.

Referring to the diagram of Fig. 3, the load current I in this case was approximately 7.92 amperes and the load power factor (cosine of angle NOK) was approximately 39%. The load voltage, represented by the line OK, was approximately 1210 volts and the generator terminal voltage, represented by the line OD, was about 950 volts. The voltage across the condenser is represented by the line DK and in this case was 300 volts. The line OC represents the generated voltage, and the demagnetizing effect which would be produced by the load current due to armature reaction at the load power factor if no condenser were employed is represented by the line CA. The line AB represents the magnetizing effect produced by the series capacitor, or in other words, this line represents the reduction in demagnetizing effect resulting from the improvement in power factor from the cosine of the angle NOK to the cosine of the angle NOD, which improvement is due to the series capacitor.

In the vector diagrams of Figs. 4 and 5, the same reference characters are employed to represent the various voltage factors as are employed in Fig. 3. Fig. 4 represents voltage conditions when the load current is substantially twice that employed in the test of Fig. 3, the load power factor remaining about the same. In the test represented by Fig. 4 the current I was about 17.95 amperes and the load power factor (cosine of angle NOK) was about 33.5%. The generator terminal voltage (line OD) dropped to about 600 volts under the increase in load, and the generator power factor (cosine of angle NOD) was about 66%. The voltage across the condenser increased with the load current to approximately 6.80 volts and accordingly, the load voltage OK was maintained substantially constant being approximately 1190 volts. The demagnetizing effect at the load power factor (line CA) increased due to the increase in load current, and the magnetizing effect of the condenser (line AB) increased slightly due to the change in the point on the generator characteristic curve at which the test was run and to the change in the difference between the generator and load power factors.

In the test represented by the diagram of Fig. 5, the load current I was substantially the same as in the test of Fig. 3, being approximately 7.92 amperes, but the constants of the load were changed to give a load power factor of about 86% (cosine of angle NOK). The generator terminal voltage (line OD) increased to about 1080 volts due to the improvement in power factor and the generator power factor (cosine of angle NOD) was about 96%. The voltage across the condenser remained at about 300 volts since the current was the same as in the test of Fig. 3, and the load voltage (line OK) was maintained substantially constant at approximately 1190 volts. The demagnetizing effect at the load power factor (line CA) decreased due to the improvement in load power factor.

The generated voltage as represented by the vector OC is of substantially the same magnitude in all of the vector diagrams, the vectors representing the no-load generated voltage. The actual generated voltage in each case is represented by the vector OB, the difference between the magnetizing and demagnetizing effects at the load and generator power factors of each test being subtracted from the no-load generated voltage.

By comparing the vector diagrams of Figs. 3, 4 and 5, it will be seen that although the generator terminal voltage decreases with an increase in load, and with a more lagging power factor, the load voltage remains substantially constant due to the increase in the voltage across the capacitor with an increase in load current and to the magnetizing effect of the capacitor. As shown by the results in the tests represented in the diagrams, it is possible with our system to maintain the voltage constant within approximately 1½% over a wide range of loads and power factors. In general, it has been found that with our system, the load voltage varies less than 5% over the entire range of useful loads and power factors encountered in seam welding practice.

Although the theory of operation of our invention and the mathematical and vectorial explanation thereof are believed to be correct, it should be understood that the efficient operation of the system to maintain the load voltage substantially constant over a wide range of loads is in no way affected by the soundness of the theories nor the accuracy of the explanations given. Accordingly, the invention is not to be limited to the operation under the theories and explanations included herein.

In Figs. 6, 7, 8 and 9 we have graphically represented the performance of our improved circuit in comparison with the performance obtained when the generator voltage is not regulated or when a voltage regulator is employed.

Fig. 6 represents the load voltage changes when a generator having no voltage regulating means is employed to supply energy to one or two welders. As shown in the graph, the voltage drops approximately 20% when each welder is connected to the generator and rises an equal amount when each welder is disconnected.

Fig. 7 shows the performance when a generator equipped with a special high speed voltage regulator is employed to successively energize two welders. As shown by the curve, the load voltage drops over 20% when each welder is connected to the generator, and although the load voltage is subsequently brought back to normal by the regulator, this readjustment consumes an appreciable time interval and the voltage is stabilized at the required value only after the interval of approximately one second. Also, when each welder is disconnected the load voltage rises over 20% and is restored to normal only after an interval of one second. These voltage fluctuations arise from the fact that a voltage change is necessary to actuate the regulator and, further, an appreciable time interval is necessarily consumed in increasing or decreasing the generator excitation.

The voltage fluctuations represented in Figs. 6 and 7 would be fatal to the formation of a uniform continuous weld. It has been found that a variation of 5% or more in load voltage causes a miss-weld, an increase of this magnitude burning the metal and a decrease producing a gap in the weld seam. Since the seam may move through the welder at a rate of 150 ft. per minute or 30 inches per second, a load voltage variation of 5% or more, and of even a fraction of a second's duration, would spoil the uniformity of the seam over an appreciable distance.

When the improved power supply circuit of the present invention is employed without a voltage regulator, the load voltage variations under varying load correspond to the representation of Fig. 8. As shown in this figure, the load voltage does not vary more than 2½% from normal at any time when the two welders are successively energized and de-energized. In the case shown, the condensive reactance of the capacitor employed is of such a value that the load voltage is actually increased by about 1½% when the first welder is thrown on and is further increased by about 1% when the second welder is energized. The successive deenergization of the two welders decreases the load voltage by about 1% and 1½% respectively. Our capacitor voltage regulation system acts instantaneously to compensate for sudden changes in load since the increase in load current which causes the decrease in generator voltage simultaneously causes a compensating increase in capacitor voltage and improvements in generator power factor which results in a compensating increase in generated voltage. The compensation takes place in the very first half cycle after the load is changed, and accordingly the voltage across the weld is maintained substantially constant and a uniform weld is produced regardless of the speed at which the seam moves past the electrodes. The voltage regulation represented in Fig. 8 corresponds to the operation obtained by the systems shown in Fig. 1 with the switches 39 and 40 open and the voltage regulator V disconnected.

In order to maintain the load voltage at the normal value regardless of changes in the temperature of the generator coils during operation, the voltage regulator V may be employed in addition to the capacitor D. With this arrangement, the voltage under varying loads is represented by the graph of Fig. 9. As shown in this figure, the load voltage increases about 1½% when the first welder is thrown on, but is immediately brought back to normal by the regulator V. When the second welder is thrown on the load voltage increases about 1% and is again quickly returned to normal by the regulator. Similarly when the welders are successively removed or deenergized, the load voltage decreases by small amounts but is in each case quickly returned to normal by the regulator.

Although the invention has been described in connection with certain specific circuits employed to supply electrical energy to certain specific devices, it should be understood that the invention is not limited to the particular circuits or devices shown. Thus the generator circuit may be connected directly to the current consuming devices, the voltage regulator may be omitted, current consuming devices or loads other than the welders shown may be energized and an alternating current source comprising an induction generator, a plurality of synchronous or induction generators connected in parallel or any other source of alternating current may be employed without departing from the scope of the invention as defined in the appended claims.

We claim:

1. The combination with a variable current load and a source of alternating current, the voltage of which varies with the load current and power factor, of a condensive reactance responsive to the load current for preventing any substantial change in the load voltage.

2. The combination with a variable current load and a source of alternating current, the voltage of which varies with the load current and power factor, of a condensive reactance responsive to the load current for instantaneously counteracting source voltage variations and thereby preventing any substantial change in the load voltage.

3. The combination with a variable current load and a source of alternating current, the voltage of which varies with the load current and power factor, of a condensive reactance connected in series with said source and said variable load for counteracting the source voltage variations and thereby maintaining the load voltage substantially constant.

4. The combination with a source of alternating current, the voltage of which varies with the load current and power factor, and a load of variable current and power factor comprising a plurality of electrical devices, and separate means for connecting each of said devices to said source of a condensive reactance responsive to the load current for preventing any substantial variation in the load voltage when the number of said devices connected to said source is changed.

5. The combination with a variable current load, and a source of alternating current, the voltage of which varies with the load current, of a capacitor connected in series with said source, said capacitor having a capacity such that the vector difference of the source voltage and the voltage across the capacitor is substantially constant at all loads.

6. The combination with a variable current load, an alternating current generator the voltage of which varies with variations in load current and means responsive to the load voltage for governing the generator voltage to restore the load voltage to the initial value after a change in load voltage due to a change in load current, of further means connected in series with said generator and said load for preventing any substantial change in load voltage.

7. The combination with a variable current load, an alternating current generator, the voltage of which varies with variations in load current and a voltage regulator for controlling the generator voltage and restoring the load voltage to the initial value after a change therein due to a variation in load current, of a capacitor connected in series with said generator and said load and having a capacity such that variations in capacitor voltage due to variations in load current act instantaneously to substantially counteract variations in generator voltage due to corresponding variations in load current.

8. The combination with a variable current load and an alternating current generator, the voltage of which varies with variations in current therethrough and with the generator power factor, of a condensive reactance connected in series with said generator and said load and having a value such that variations in generator voltage due to variations in load current are partially counteracted by variations in voltage across said condensive reactance due to variations in load current and are further counteracted by variations in generator power factor due to said condensive reactance, whereby the load voltage is maintained substantially constant when the load current is varied.

9. The combination with an alternating current generator the voltage of which varies with variations in the current therethrough, a load of variable current comprising a plurality of current consuming devices and separate means for connecting each of said devices to said generator, of a capacitor connected in series with said generator and said load and having a capacity such that variations in generator voltage due to variations in load current resulting from a change in the number of devices comprising the load are substantially counteracted by said capacitor, and any substantial change in load voltage upon a variation in load current is prevented.

10. The combination with an alternating current generator the voltage of which varies with variations in current therethrough, a load of variable current comprising a plurality of electrical devices and separate means for connecting each of said devices to said generator, of a capacitor connected in series with said generator and said load and having a capacity such that variations in generator voltage due to variations in load current resulting from a change in the number of devices comprising the load are substantially counteracted by said capacitor and any substantial change in load voltage upon a variation in load current is prevented, and means responsive to changes in load voltage for altering the generator voltage to restore the load voltage to the initial value after a slight change in load voltage due to a change in the number of devices connected to the generator.

11. The combination with an alternating current generator the voltage of which varies with variations in the current therethrough, a load of variable current comprising a plurality of electrical devices and separate means for connecting each of said devices to said generator, of a capacitor connected in series with said generator and said load and having a capacity such that variations in generator voltage due to variations in load current resulting from a change in the number of devices comprising the load are substantially counteracted by said capacitor and any substantial change in load voltage upon a variation in load current is prevented, and a voltage regulator for altering the generator voltage to restore the load voltage to the initial value after a slight change in load voltage due to a change in the number of devices connected to said generator.

12. The combination with an alternating current generator, the voltage of which varies with variations in the current therethrough and with the generator power factor, a load of variable current and power factor comprising a plurality of electrical devices, and separate means for connecting each of said devices to said generator in parallel, of a capacitor connected in series with said generator and said load and having a capacity such that variations in generator voltage due to variations in load current and power factor resulting from a change in the number of devices comprising the load are substantially counteracted by variations in voltage across said capacitor and variations in generator power factor due to variations in load current and any substantial change in load voltage upon a variation in load current is prevented.

13. The combination of an alternating current generator, the voltage of which varies with variations in the current therethrough and with the generator power factor, a load of varying current and power factor comprising a plurality of seam welders and means for selectively connecting said welders to said generator in parallel, of a capacitor connected in series with said generator and said load and having a capacity such that variations in generator voltage due to variations in load current or power factor are substantially counteracted by variations in voltage across said capacitor and by variations in generator power factor due to said capacitor when the load current varies, and any substantial change in load voltage upon a change in the number of said welders energized by said generator is prevented.

14. The combination with a variable current load and a source of alternating current, the voltage of which varies with the load current and power factor, of a condensive reactance in series with said source and said variable load for counteracting the source voltage variations and thereby maintaining the load voltage constant within less than 5%.

15. The combination with an alternating current generator, the voltage of which varies with variations in the current therethrough and with the generator power factor, a load of variable current and power factor comprising a plurality of electrical devices and separate means for connecting each of said devices to said generator in parallel, of a capacitor connected in series with said generator and said load and having a capacity such that variations in generator voltage due to variations in load current and power factor resulting from a change in the number of devices comprising the load are substantially counteracted by variations in voltage across said capacitor and variations in generator power factor due to variations in load current, and the load voltage is maintained constant within less than 5% under variations in load current and power factor.

In testimony whereof we affix our signatures.

EDWIN W. SWANSON.
FRANK N. SWANSTROM.